United States Patent

Tasaki et al.

[11] Patent Number: 5,214,864
[45] Date of Patent: Jun. 1, 1993

[54] CHAIN SAW

[75] Inventors: Takanobu Tasaki; Hiroji Kawasaki, both of Tokyo, Japan

[73] Assignee: Kioritz Corporation, Tokyo, Japan

[21] Appl. No.: 821,785

[22] Filed: Jan. 16, 1992

[30] Foreign Application Priority Data

Jan. 28, 1991 [JP] Japan .................. 3-07777[U]

[51] Int. Cl.⁵ .................................. B25F 3/00
[52] U.S. Cl. ............................... 30/123.4; 30/383
[58] Field of Search .............. 30/123.4, 122, 381, 30/383; 184/6.28, 15.1; 29/239, 240, 264

[56] References Cited

U.S. PATENT DOCUMENTS

| 2,370,556 | 2/1945 | Mall | 30/123.4 |
|---|---|---|---|
| 2,409,775 | 10/1946 | Mall et al. | 30/123.4 |
| 2,748,810 | 6/1956 | Strunk | 30/123.4 |
| 2,827,932 | 3/1958 | Strunk | 30/123.4 |
| 3,448,829 | 6/1969 | Rauh et al. | 184/27 |
| 3,865,213 | 2/1975 | McDermott | 184/15.1 |
| 3,938,622 | 2/1976 | Densow | 184/15 R |
| 4,662,071 | 5/1987 | Hoppner | 30/381 |
| 4,813,139 | 3/1989 | Nagashima | 30/123.4 |
| 4,847,999 | 7/1989 | Nagashima | 30/123.4 |
| 4,884,340 | 12/1989 | Newman | 30/123.4 |
| 4,893,407 | 1/1990 | Lane | 30/123.4 |
| 4,928,390 | 5/1990 | Gassen et al. | 30/123.4 |
| 4,945,637 | 8/1990 | Anderson | 30/123.4 |

Primary Examiner—Douglas D. Watts
Assistant Examiner—Hwei-Sin Payer
Attorney, Agent, or Firm—Bauer & Schaffer

[57] ABSTRACT

The prime mover of a chain saw has an output shaft passing through the body of an oil pump. A fixing screw is inserted through an inserting hole provided in the body and is screwed into a threaded hole provided on the side of the prime mover. A cover plate, covering the area tip of the output shaft, is press fit onto the output shaft. The inserting hole is made as a threaded hole having a diameter through which the fixing screw is freely insertable but is also adapted to receive a removing screw which is larger in diameter than the fixing screw, and which abuts against the side of the prime mover. As a result, the inserting hole can be used in common also as the oil pump removing screwed hole and no extra removing screwed hole is required to be provided.

1 Claim, 3 Drawing Sheets

CHAIN SAW

FIELD OF THE INVENTION

This invention relates to a chain saw and in particular to an improved structure for easy removal of the lubricating oil pump.

BACKGROUND OF THE INVENTION

An oil pump is generally operatively connected to the output shaft of the prime mover of a chain saw in order to feed lubricating oil between the saw chain and the guide bar on which it is held. The oil pump case is secured to a side of the prime mover by inserting fixing screws through holes provided in the case body and screwing the fixing screws into threaded holes provided on the side of the prime mover. A dust preventing and thrust receiving plate, covering the area of the output shaft at the tip of the case body, is press fit onto the output shaft.

Therefore, in order to remove the oil pump for maintenance or the like, the case body and the cover plate must first be removed from the output shaft. However, as the cover plate is press fit onto the output shaft, it will be very difficult to remove them, unless special measures are taken.

Therefore, in the conventional chain saw, extra screw holes receiving disassembling push screws have been provided in addition to the inserting holes in the case body of the oil pump. Thus when the case body and the cover plate are to be removed, the disassembling push screws are inserted into the extra disassembling holes so that the case may be pushed up and away from the prime mover. That is to say, after the fixing screws are removed, and the disassembling push screws are inserted into the extra disassembling screwed holes, the push screws will move relatively with the case body. The tips of the push screws contact and bear against the side wall of the prime mover so that upon further screwing, the case will move outwardly toward the tip end of the output shaft and the case body and the cover plate will be able to be removed.

However, in the above mentioned conventional chain saw, as the extra disassembling holes are provided in addition to the fixing holes the number of manufacturing steps and the cost are increased.

Also, a disadvantage arises in that saw dust or the like will accumulate in the extra holes.

Incidentally, in the above mentioned conventional chain saw, the fixing screw inserting holes provided in the case body of the oil pump are not threaded holes but are through holes.

SUMMARY AND OBJECTS OF THE INVENTION

An object of the present invention is to provide a chain saw wherein an oil pump can be easily removed.

A second object of the present invention is to provide a chain saw wherein the number of manufacturing steps is reduced and the cost is lowered.

A third object of the present invention is to provide a chain saw in which saw dust is hard to accumulate.

In order to attain the above mentioned objects, the present invention provides a chain saw having a prime mover, the output shaft of which is inserted through the center of a case body which is itself operatively connected with an oil pump. A fixing screw is inserted through an inserting hole provided in the case body and is screwed into a hole provided on one side of the prime mover so as to fix the case body to the prime mover. A cover plate, covering the area of the output shaft tip is press fitted onto the output shaft and is secured in place.

According to the present invention, the inserting hole into which the fixing screw is insertable is threaded and has a larger diameter than the diameter of the fixing screw. Therefore, it can be used in common both as the hole through which the fixing screw passes and as the extra screw hole for the disassembling screw.

Thus when the case body and the cover plate of the oil pump are to be removed from the side of the prime mover removing screws of a size, but fitting the inserting holes are screwed into the inserting holes. Because, such large screws do not fit into the threaded holes in the prime mover, their tips will contact the periphery of the mouth of the hole and as a result the case body will then be caused to move outwardly toward the tip of the output shaft. In the same manner as in the conventional chain saw, the case body and the cover plate will then be able to be easily taken out.

Thus, according to the present invention, as the inserting hole can be used in common as an extra screw hole for the removing push screw, it differs significantly from the conventional chain saw. Since only inserting holes for fixing screws need be provided in the case body of the oil pump, extra screw holes need not be provided. Therefore, as compared with the conventional chain saw, the number of manufacturing steps are reduced, manufacturing cost is lower and saw dust and the like become harder to accumulate.

DETAILED DESCRIPTION OF THE PREFERRED EMBODIMENT

An embodiment of the present invention is explained in the following with reference to the drawings.

Figure 1:
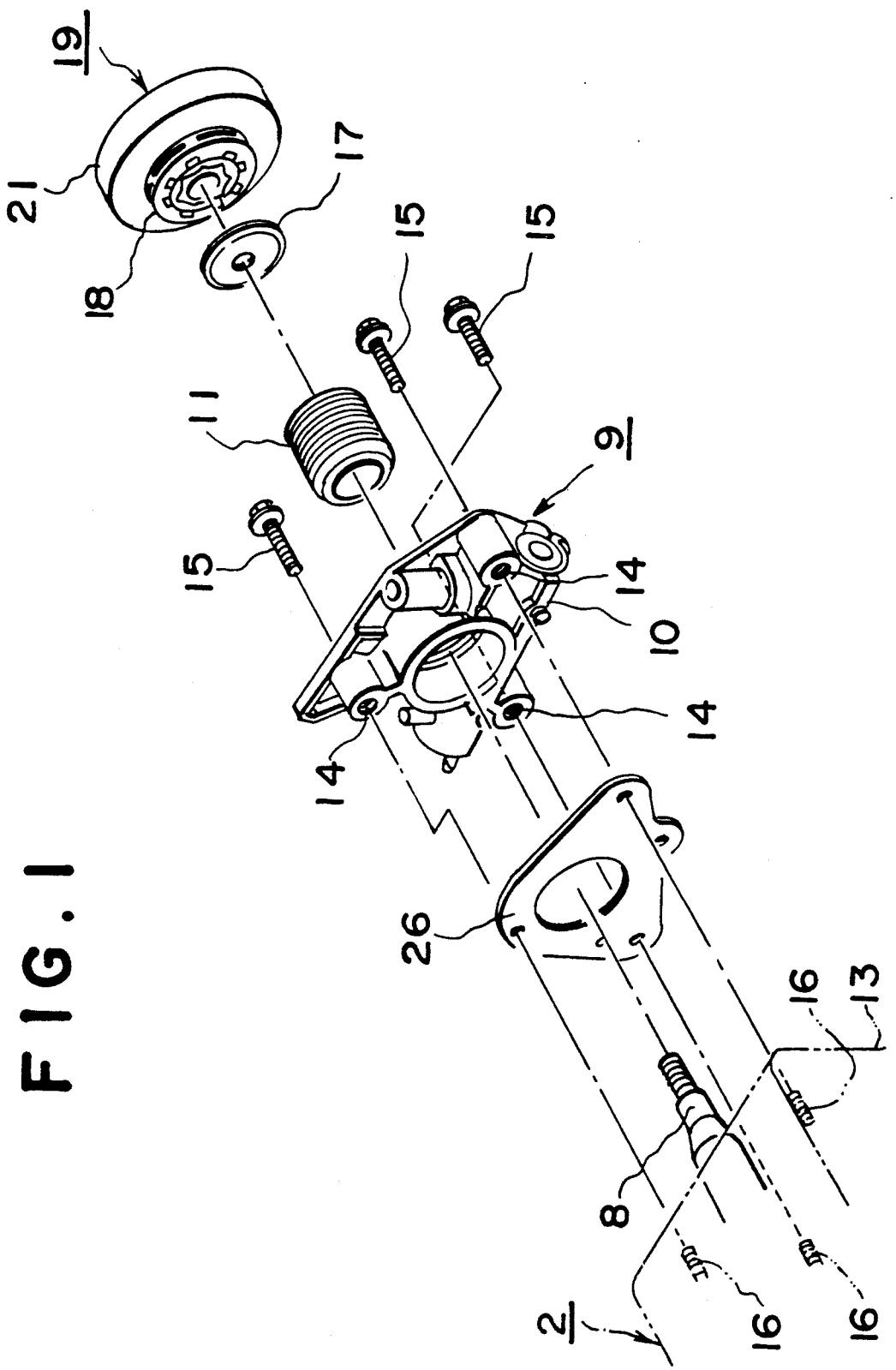
FIG. 1 is an exploded perspective view of an essential part of a chain saw illustrating the present invention.
Figure 2:
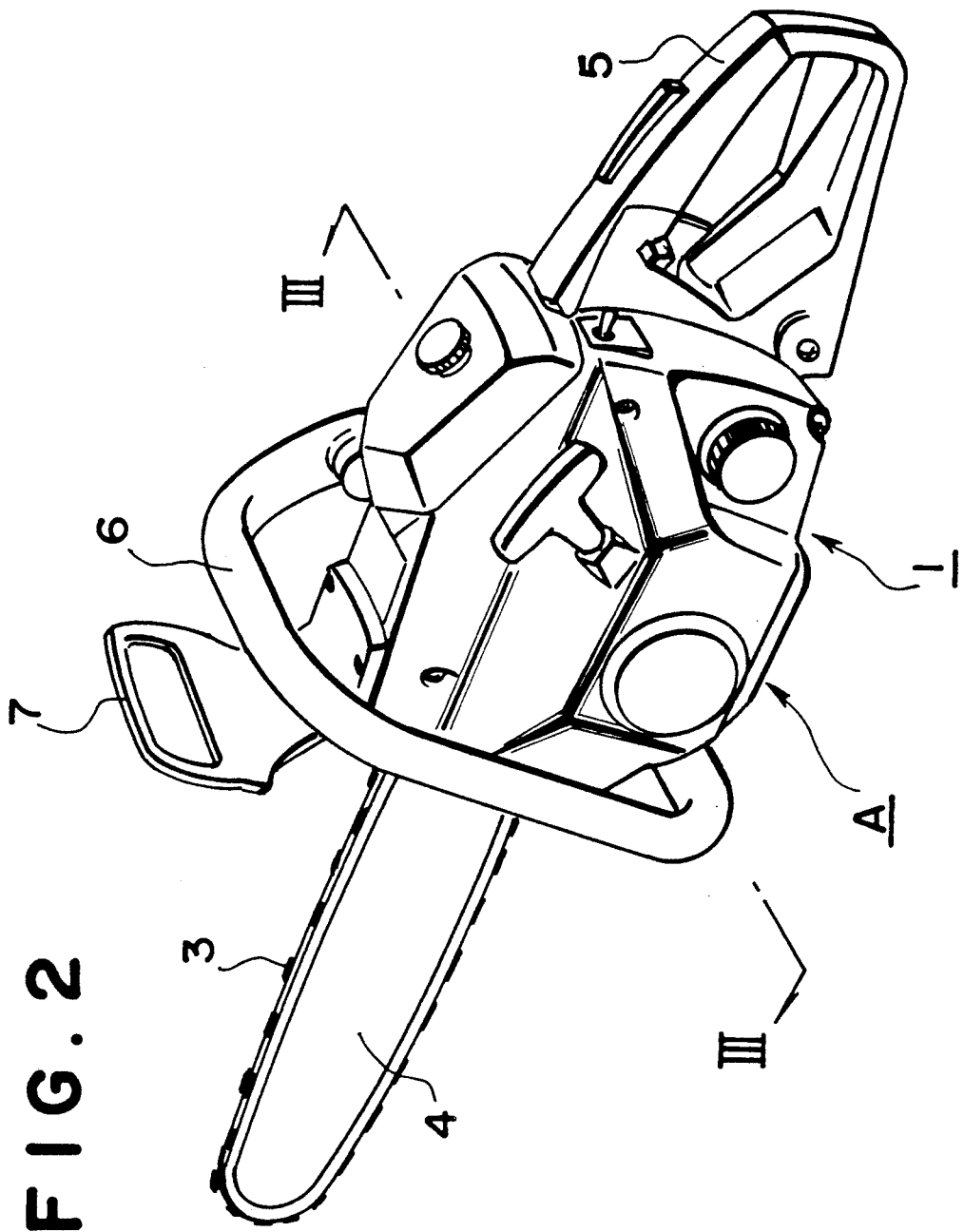
FIG. 2 is a perspective view of the chain saw to which the embodiment of FIG. 1 may be applied.
Figure 3:
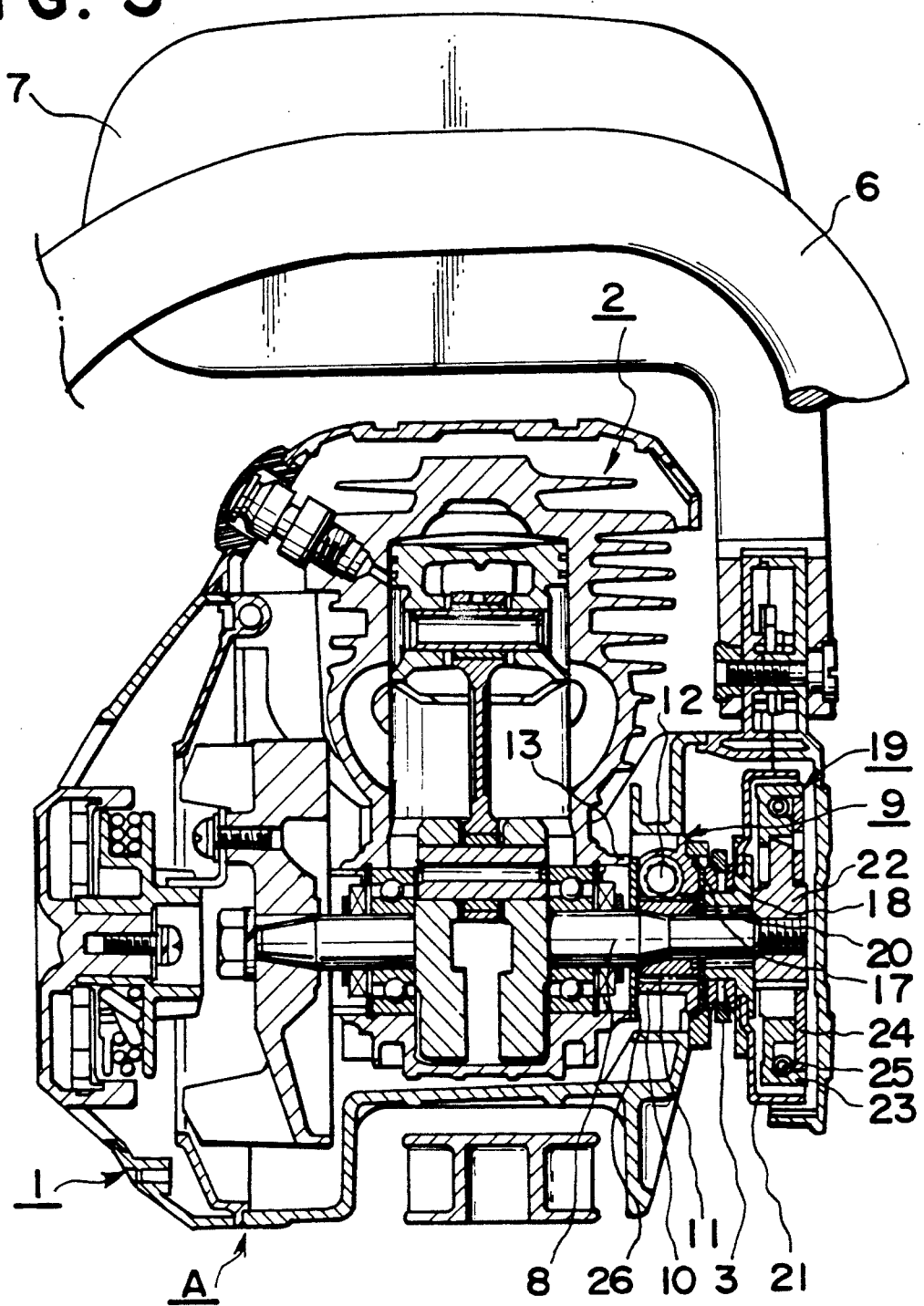
FIG. 3 is a partially sectioned view of the chain saw taken along line III—III of FIG. 2.

As seen in FIG. 2 and 3, the chain saw, generally depicted by the letter A comprises a body 1 provided within it an air-cooled two-cycle gasoline engine 2 or the like which is a prime mover, a saw chain 3 driven by the engine 2, a rear handle 5, a front handle 6, and a front hand guard 7.

The chain saw also includes the engine output crankshaft 8 and an oil pump 9 operatively connected with the crankshaft 8 to lubricate saw chain 3. The oil pump 9 comprises a case body 10, a worm 11 inserted over the end of and fixed on the crankshaft 8 and arranged within the case body 10 and a pump plunger 12 rotated and reciprocated by the worm 11 for automatically feeding lubricating oil between the saw chain 3 and a guide bar 4.

The case body 10 through which the crankshaft 8 passes is screwed on one side 13 of the crankcase of the engine 2 by inserting fixing screws 15 through inserting holes 14 provided in the case body 10 so as to threadily fixed into screw holes 16 provided on the one side 13 of the crankcase.

A cover plate 17 is press fitted onto the crankshaft 8 from outside the case body 10 so as to conjointly rotate with the crankshaft 8 and cover the outermost tip of the crankshaft. In the embodiment shown in the drawings, this cover plate 17 will prevent dust (cutting dusts produced by cutting wood or the like) which may be carried by the saw chain 3 (driven by a later described chain driving sprocket 18) from entering the case body 10 and will act as a thrust receiver, in the thrust direction, of a centrifugal clutch 19.

The centrifugal clutch 19 comprises a drum 21 fitted rotatably to the tip of the crankshaft 8 through a needle bearing 20 (see FIG. 3), a clutch boss 22 screwed and fixed to the tip of the crankshaft 8, clutch shoes 23, a cover plate 24 and a tension spring 25. When the number of revolutions of the crankshaft 8 is low, the clutch shoes 23 will separate from the clutch drum 21 and no power will be transmitted to the clutch drum 21 but, when the number of revolutions of the crankshaft 8 reaches a predetermined number of working revolutions, the clutch shoes 23 will be pressed against the inner periphery of the clutch drum 21 by centrifugal force so that power will be transmitted to the clutch drum 21. The chain driving sprocket 18 is fitted to the clutch drum 21 and engages the saw chain 3 to drive it.

A dust preventing pad 26 is also provided.

The inserting holes 14 provided in the case body 10 are threaded holes having a diameter larger than the fixing screws 15 through which the fixing screws 15 are freely insertable. That is to say, for example, in case the fixing screws 15 have an outside diameter of 4 mm, the inserting holes 14 will be made as female threaded holes of a diameter of 5 or 6 mm. Needless to say, that in such case, the screw holes 16 provided in the crankcase 13 will have a diameter of 4 mm so that the fixing screws will engage within these holes.

This allows the chain saw A, according to the present invention to employ the threaded hole 14 (having a diameter through which the fixing screw 15 is freely insertable) to be simultaneously used as the so called extra hole needed in the conventional chain saw to provide for removal of the oil pump.

In the present invention when the case body 10 and the cover plate 17 are to be removed, in order to remove the oil pump 9, the fixing screws 15 are first removed from the inserting holes 14. Thereafter screws (not illustrated) of a size (larger than the size of the fixing screws 15) fitting the female thread of the inserting holes 14 are into the holes 14. As these screws move through the holes 14 their tips will protrude outwardly therefrom and soon contact the peripheries of the screw holes 16 in the crankcase. Since the holes 16 have a smaller diameter, on further threading of the larger screws, the screws reacting against the crankcase 13 and the threads in the holes 14 will cause the case body 10 to move outwardly toward the tip of the crankshaft 8 and as in the conventional chain saw, permit the case body 10 and the cover plate 17 to be easily removed.

Thus, since the inserting holes 14 can be used in common as removing screw holes, only the fixing screw inserting hole 14 may be provided in the case body 10 and extra screw holes specifically for the removing screw need not be provided. Therefore, as compared with the conventional chain saw, the number of manufacturing steps will be reduced by eliminating the extra removing screwed holes and the cost will be reduced by eliminating the extra removing screwed holes and the cost will be lowered.

In the conventional chain saw, as the extra removing screw holes are naturally not covered with a cover plate or the like, saw dust or the like will accumulate. This disadvantage is removed in the chain saw according to the present invention, as the inserting holes 14 are normally covered by the heads of the fixing screws 15.

As explained in detail in the above, according to the present invention, the oil pump can be easily removed, the number of manufacturing steps can be reduced, the cost is low and saw dust and the like are hard to accumulate.

What is claimed is:

1. In a chain saw having an oil pump connected to the output shaft of a prime mover for lubricating the saw chain, the oil pump having a case body fixedly supported by a fixing screw inserted through an inserting hole provided in said case body and threadedly engaging into a screw hole provided on a side of the prime mover and a cover plate removably secured to the tip of the output shaft, the improvement wherein said inserting hole is threaded and has a diameter larger than the diameter of said fixing screw and that of said screw hole so that said fixing screw passes freely through said inserting hole and in threaded engagement with said screw hole and is adapted to threadedly and tightly receive a screw of a larger diameter than that of said fixing screw so that said screw engages the periphery of said screw hole to react therewith to cause the case body to move outwardly from the side of the prime mover.

* * * * *